United States Patent
Blakley

(10) Patent No.: US 6,517,233 B2
(45) Date of Patent: *Feb. 11, 2003

(54) SUPPORT ASSEMBLY FOR SUPPORTING A STEADY BEARING

(75) Inventor: Robert A. Blakley, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/094,726

(22) Filed: Mar. 12, 2002

(65) Prior Publication Data

US 2002/0089895 A1 Jul. 11, 2002

Related U.S. Application Data

(63) Continuation of application No. 09/750,270, filed on Dec. 29, 2000, now Pat. No. 6,386,753.

(51) Int. Cl.$^7$ ................................................. B01F 15/00
(52) U.S. Cl. ........................................................ 366/331
(58) Field of Search .................................. 366/262–265, 366/270, 285, 286, 331; 384/428, 441, 535, 536, 581, 582; 464/180, 181; 248/351; 416/174

(56) References Cited

U.S. PATENT DOCUMENTS

| | | | | |
|---|---|---|---|---|
| 1,647,386 A | * | 11/1927 | Weis | |
| 2,919,888 A | * | 1/1960 | Simmons | |
| 2,936,999 A | * | 5/1960 | Coar et al. | |
| 3,149,888 A | * | 9/1964 | Lennon | |
| 3,180,696 A | * | 4/1965 | Buse | |
| 3,379,415 A | * | 4/1968 | Logue | |
| 3,443,794 A | * | 5/1969 | Peterson | |
| 3,489,469 A | * | 1/1970 | Stratienko | |
| 4,025,131 A | * | 5/1977 | Bergquist et al. | |
| 4,240,550 A | * | 12/1980 | Collin | |
| 4,565,453 A | * | 1/1986 | Jekat et al. | |
| 4,660,989 A | * | 4/1987 | Davis | |
| 4,932,787 A | * | 6/1990 | Fasano | |
| 5,017,104 A | * | 5/1991 | Baker et al. | |
| 5,026,175 A | * | 6/1991 | Sato | |
| 5,088,832 A | * | 2/1992 | Gambrill et al. | |
| 5,568,975 A | * | 10/1996 | Blakley et al. | |
| 5,618,107 A | * | 4/1997 | Bartsch | |
| 5,758,966 A | * | 6/1998 | Prillwitz | |
| 6,386,753 B1 | * | 5/2002 | Blakley | |
| 2002/0001256 A1 | * | 1/2002 | Dietz | 366/331 |

FOREIGN PATENT DOCUMENTS

| | | | | |
|---|---|---|---|---|
| FR | 1011067 | * | 6/1952 | 384/441 |
| FR | 2663089 | * | 12/1991 | 384/428 |
| GB | 819111 | * | 8/1959 | 384/428 |

* cited by examiner

Primary Examiner—Charles E. Cooley
(74) Attorney, Agent, or Firm—Baker & Hostetler LLP

(57) ABSTRACT

An adjustable steady bearing support assembly and method provides support for a bearing in rotational contact with a shaft in a vessel such as a mixing vessel. The assembly and method allows axial movement of the bearing along the shaft in response to changes in the radial dimensions of the vessel while providing radial support of the bearing. The assembly employs strut assemblies having pivotally mounted strut pairs with an included angle between the struts in each pair to resist torsional forces on the bearing.

8 Claims, 3 Drawing Sheets

SUPPORT ASSEMBLY FOR SUPPORTING A STEADY BEARING

This application is a Continuation of U.S. application Ser. No. 09/750,270, filed Dec. 29, 2000, now U.S. Pat. No. 6,386,753.

FIELD OF THE INVENTION

The present invention relates generally to apparatus and methods for supporting steady bearings, which are used to support impeller shafts mounted in a variety of reactors, vessels and mixing apparatus. Steady bearings for shafts in such vessels are in wide use in the chemical, petroleum, pharmaceutical, cosmetic, food preparation and other industries. More particularly, the present invention relates to a steady bearing support that adjusts to accommodate radial expansion and contraction of the vessel wall.

BACKGROUND OF THE INVENTION

When in operation, impeller shafts are subject to a number of forces that act to damage and possibly lead to failure of the impeller shaft. A mixer shaft driving an impeller in a vessel can undergo substantial dynamic bending distortion during mixing operation. This dynamic distortion can cause permanent damage or distortion and even complete failure of the impeller shaft during operation. Impeller shafts, especially longer shafts, are prone to lateral displacement while in operation, due to the force of loads in the mixing vessel. It is known to provide one or more intermediate steady bearings along an impeller shaft to control dynamic bending distortion of the shaft. In addition, such assemblies provide lateral stability to the impeller shaft during operation. However, steady bearings used for intermediate support of impeller shafts operating in 360° motion in mixing vessels can be subject to extreme torsional forces due to variations in frictional forces between the shaft and bearing surface. The steady bearing therefore requires support to prevent twisting of the bearing in the direction of rotation of the shaft. Such intermediate steady bearings can be supported by one or several rigid struts extending from the wall or floor of the vessel to provide torsional as well as lateral stability to the steady bearing. These rigid strut assemblies may provide adequate support when mixing operations are carried out at ambient temperatures and pressures. However, at conditions of elevated pressure and temperature, significant changes in vessel dimensions due to expansion can cause rigid strut assemblies to fail.

A steady bearing support assembly that adjusts for distortions in vessel dimensions due to changes in pressure and temperature can alleviate this problem. One example of an adjusting support employs an adjustable bearing support with a plurality of strut pairs, in which the struts of each pair are substantially parallel. The strut pairs are pivotally connected to the vessel wall and a bearing support ring, such that the struts define an angle of inclination to the impeller shaft. The angle of inclination can change in response to dimensional distortions in the vessel allowing the bearing to slide axially along the impeller shaft.

It is desirable to provide an adjustably supported steady bearing that not only protects an impeller shaft from dynamic distortions while in operation, and provides lateral support, but also provides desirable support against torsional forces when the impeller is in operation.

SUMMARY OF THE INVENTION

It is therefore a feature and advantage of the present invention to provide an adjustable steady bearing support method and assembly for a bearing in rotational contact with the surface of a shaft in a vessel, which provides desirable lateral stability and allows axial movement of the bearing along the shaft in response to changes in the radial dimensions of the vessel while also providing support against torsional forces on the bearing. The above and other features and advantages are achieved through the use of a novel design as herein disclosed.

In accordance with one embodiment of the present invention, the invention provides support for a steady bearing by providing a plurality of strut assemblies distributed radially around the shaft for supporting a bearing holder, which in turn holds the steady bearing. Each strut assembly includes a strut pair, where the struts in each pair are pivotally attached at one end to the vessel wall and at the other end to the bearing holder. The struts of each pair are disposed at a substantially dihedral angle to each other.

In a more detailed aspect of an embodiment, support is provided to the strut assembly by a plurality of studding outlets provided radially around the vessel wall. The studding outlets are all located in a common plane in the vessel wall that is substantially perpendicular to the axis of rotation of the shaft. Each strut in each pair is pivotally attached at one end to a studding outlet.

In another more detailed aspect of an embodiment, a bearing holder such as a support ring is provided to support the bearing housing, wherein the bearing is held substantially in coaxial rotation contact with the shaft. The support ring includes a plurality of attachment points distributed radially around the outer edge of the support ring. Each strut in each pair is further pivotally connected to the support ring at one of the attachment points such that the support ring is supported in a plane that is substantially perpendicular to the axis of rotation of the shaft.

In another aspect, when assembled, the struts of each pair define an angle of inclination to the axis of the impeller shaft such that the plane of the support ring is lower than the plane of the studding outlets. The pivotal connections at either end of the struts in each pair allow this angle of inclination to change as the bearing slides axially up and down the shaft in response to changes in the radial dimensions of the vessel.

A further object of the current invention is to provide a mixing apparatus, which makes use of the bearing support assembly defined above.

A still further object of the current invention is a method for supporting a steady bearing in coaxial rotational contact with the surface of a shaft. The method of the current invention allows axial movement of the bearing along the shaft in response to changes in the axial dimensions of the vessel, while providing lateral support and support for torsional forces on the bearing.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS

Figure 1:
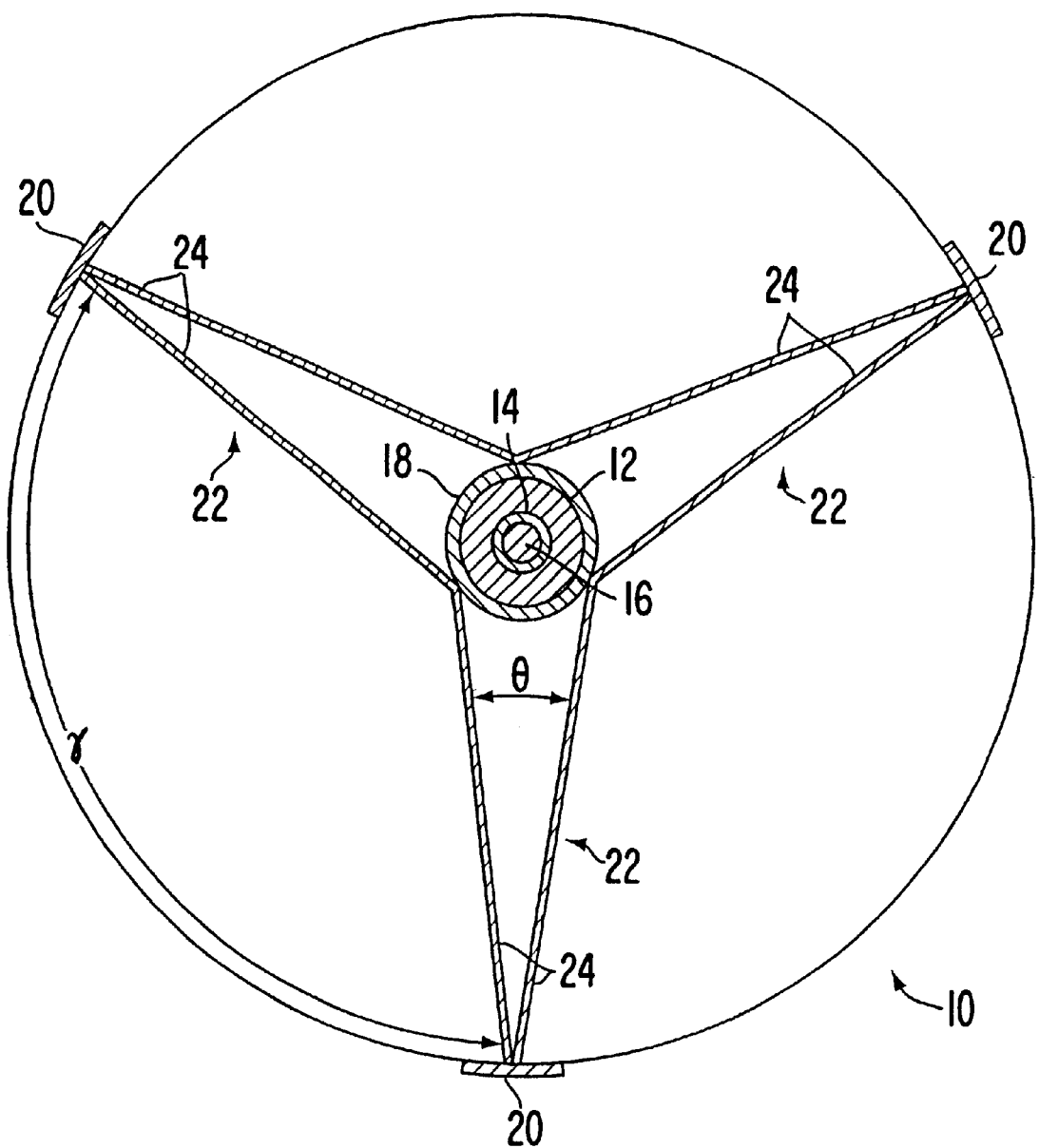
FIG. 1 is an overhead partially sectional and cutaway view of a mixing vessel with three strut assemblies according to the present invention supporting a steady bearing.

Referring to FIG. 1, a vessel 10 is equipped with an intermediate steady bearing housing 12 for housing a steady bearing 14 around a shaft 16. The bearing housing 12 may be detachably connected to a supporting ring 18, Thus, the bearing housing 12 in some embodiments may be used detachably from a support ring 18 (e.g., for installation). The bearing housing 12 and, if provided, supporting ring 18, together form a bearing holder. Alternatively, the bearing housing 12 and support ring 18 may be essentially an integral component together forming a bearing holder.

Still referring to FIG. 1, a plurality of studding outlets 20 are provided on the wall of the vessel 10. Three strut assemblies 22 each comprising a pair of struts 24 are provided, where each strut in the pair has a first end 26 and a second end 28, as shown in FIG. 2.

Figure 2:
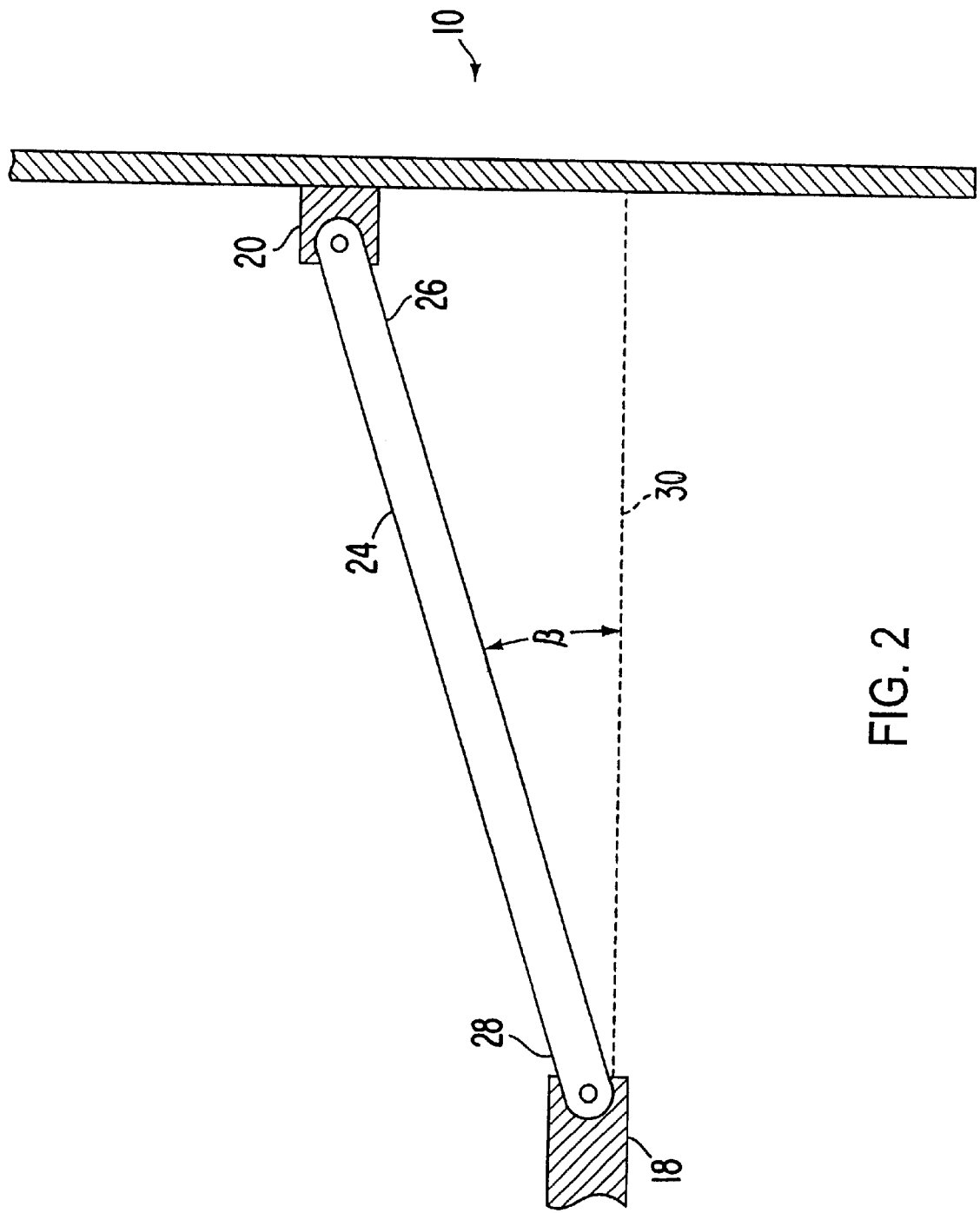
FIG. 2 is a partially sectional and cutaway side view of a strut pair according to the present invention supporting a support ring for a steady bearing.

Referring now to FIG. 2, each strut 24 in each strut pair 22, is pivotally connected at a first end 26 to a studding outlet 20 and at a second end 28 to the support ring 18, or to the bearing housing 12 when no detachable support ring is provided, such that an angle of inclination β to a line 30 perpendicular to the axis of rotation of the impeller shaft is defined at ambient conditions, when the equipment is not in operation. When the equipment is in operation and the radial dimensions of the vessel change, the angle of inclination is changed by pivotal motion of each strut 24 in the strut pairs 22 at the first end 26 and the second end 28, to define a new angle of inclination that is less than β, thus allowing the bearing and bearing housing to move axially along the impeller shaft in response to changes in the radial dimensions of the vessel 10, as well as providing lateral and torsional support to the impeller shaft when in operation. In a preferred embodiment of the present invention the angle β is 10° at ambient conditions and β is 9° at operating conditions. However, those skilled in the art will recognize that other angles β and ranges of angles are possible for ambient and operating conditions.

Referring to FIGS. 1 and 2, an angle θ between the struts in each pair is defined. Each pair of struts is disposed along a conical surface of rotation about the shaft axis. In the embodiment illustrated, the angle θ is determined such that the first ends 26 of each strut in a strut pair are attached to the studding outlet 20 such that the first ends of the struts in each pair are proximate to each other. The angle θ is further determined by the radial dimensions of the bearing support ring 18 such that second ends 28 of adjacent struts in neighboring strut pairs 22 are attached to the support ring 18 proximate to one another. In general, the angle θ is defined such that the distance between the first ends 26 of the struts in each strut pair 22 is less than the distance between the second ends 28 of the struts in each strut pair. This configuration provides torsional stability. In a preferred embodiment, the angle may be between 1° and 45°. Various embodiments of a mixing vessel employing an adjustable steady bearing support according to the current invention can provide improved bearing life and less damage to the impeller shaft due to bending and lateral movement.

As used herein, the terms "radial" and "lateral" both refer to the directions perpendicular to the longitudinal axis of rotation of the shaft 16. The term "torsional" refers to rotations about the longitudinal axis of the shaft 16. The term "axial" refers to the direction along the longitudinal axis of rotation of the shaft 16.

A preferred embodiment of the present inventive apparatus and method is illustrated in FIG. 1, where three strut pairs 22 are provided for support of the bearing support ring 18. Correspondingly, three studding outlets 20 are provided in the vessel wall such that the studding outlets are equally spaced and separated from each other by an angle of 120°. However, those skilled in the art will recognize that it is possible to provide a number of more than three studding outlets and strut pairs. Four or more strut pairs may be employed.

Figure 3:
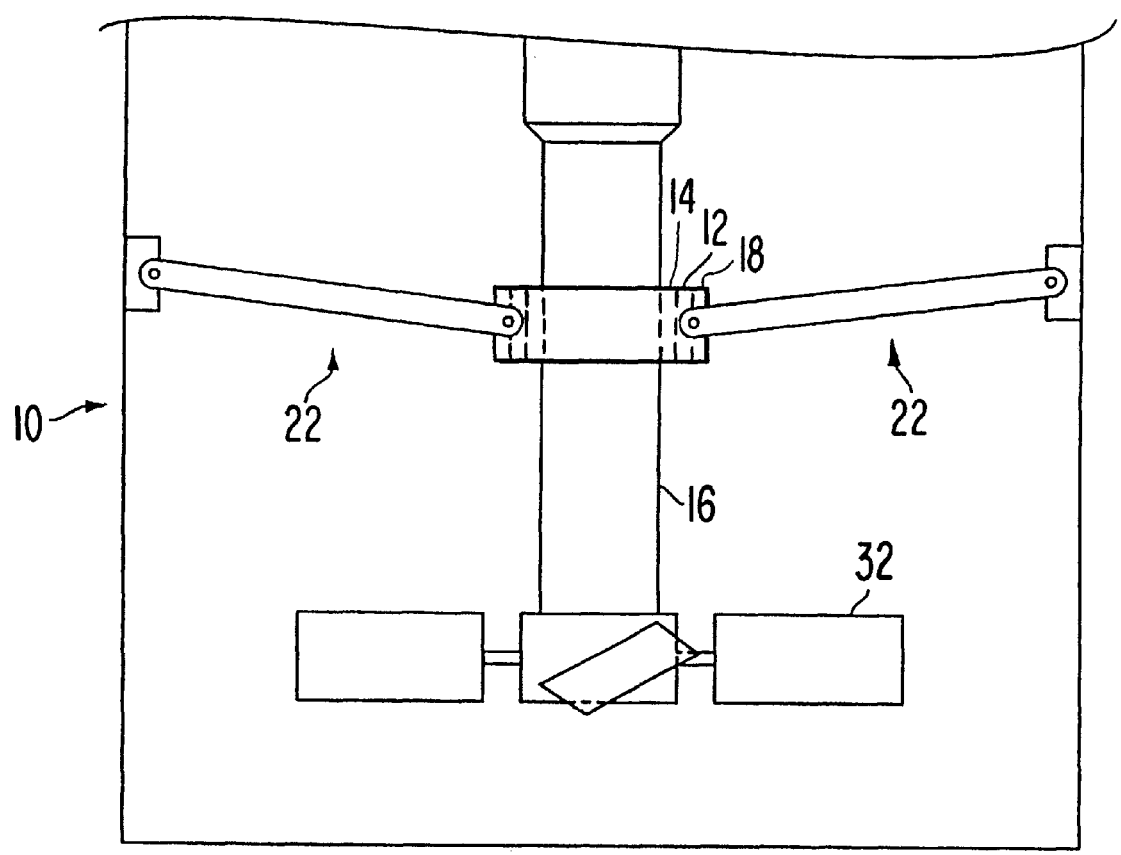
FIG. 3 is a cutaway side view of strut assemblies installed in a mixing vessel.

FIG. 3 shows the strut assemblies 22 supporting a bearing housing 12 in a vessel 10 that is a mixing vessel, with a shaft 16 that has a mixing impeller 32.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for supporting a steady bearing holder for a bearing in a coaxial rotational contact with the surface of a shaft having a longitudinal axis of rotation in a vessel, comprising:

means for allowing axial movement of the bearing along the shaft in response to changes in radial dimensions of the vessel and for maintaining radial support of the shaft using a plurality of strut assemblies, each of said strut assemblies comprising a strut pair disposed radially around the shaft for supporting the bearing holder within the vessel; and means for resisting torsional movement about the shaft axis by the bearing due to friction between the bearing and shaft by locating the pairs of struts with an included angle between the struts of the pair so that the struts are disposed along a conical surface of rotation about the shaft axis.

2. An apparatus according to claim 1 wherein said strut pairs are each disposed at equal angular intervals about the shaft axis.

3. An apparatus according to claim 1, wherein a number of said strut assemblies is three.

4. An apparatus according to claim 1, wherein the included angle is between 1° and 45°.

5. An apparatus according to claim 1, wherein each strut includes a first end thereof pivotally connected to the wall of the vessel and a second end thereof pivotally connected to the bearing holder.

6. An apparatus according to claim 5, wherein the vessel has a plurality of studding outlets for pivotally supporting the first ends of said struts.

7. An apparatus according to claim 5, wherein the bearing holder has a plurality of attachment points for pivotally supporting the second ends of the struts.

8. An apparatus according to claim 5, wherein the bearing holder includes a support ring detachable from the remainder of the bearing holder and the support ring has a plurality of attachment points for pivotally supporting said second ends of said struts.

* * * * *